(12) United States Patent
Garcia Cruz et al.

(10) Patent No.: US 9,090,316 B2
(45) Date of Patent: Jul. 28, 2015

(54) DEVICE FOR REMOTELY TRACKING BODIES OF WATER AND METHOD FOR REMOTELY AND SIMULTANEOUSLY MANAGING AND OPERATING A SET OF SAID DEVICES

(75) Inventors: Raul Garcia Cruz, Cadiz (ES); Francisco Javier Gutierrez Royo, Great Yarmouth (GB); Gabriel Navarro Almendros, Cadiz (ES); Javier Tomas Ruiz Segura, Cadiz (ES)

(73) Assignee: CONSEJO SUPERIOR DE INVESTIGACIONES CIENTIFICAS (C.S.I.C.), Madrid (ES)

( * ) Notice: Subject to any disclaimer, the term of this patent is extended or adjusted under 35 U.S.C. 154(b) by 0 days.

(21) Appl. No.: 14/126,384

(22) PCT Filed: Jun. 8, 2012

(86) PCT No.: PCT/ES2012/070432
§ 371 (c)(1),
(2), (4) Date: Dec. 13, 2013

(87) PCT Pub. No.: WO2012/172141
PCT Pub. Date: Dec. 20, 2012

(65) Prior Publication Data
US 2014/0137785 A1    May 22, 2014

(30) Foreign Application Priority Data

Jun. 13, 2011 (ES) .................................. 201130980

(51) Int. Cl.
*B63B 22/24* (2006.01)
*B63B 35/44* (2006.01)
(Continued)

(52) U.S. Cl.
CPC ................ *B63B 35/44* (2013.01); *B63B 22/00* (2013.01); *G01S 5/0027* (2013.01); *G01S 19/14* (2013.01); *B63B 2022/006* (2013.01); *G08B 25/10* (2013.01)

(58) Field of Classification Search
CPC ........ B63B 22/00; B63B 22/16; B63B 22/18; B63B 22/20; B63B 22/24
USPC ............................ 441/1, 6, 11, 21, 22, 28, 32
See application file for complete search history.

(56) References Cited

U.S. PATENT DOCUMENTS 3,906,565 A * 9/1975 Dorrance et al. ............... 441/22
5,007,285 A * 4/1991 Dahlen et al. ............. 73/170.04
(Continued)

FOREIGN PATENT DOCUMENTS

ES    2212920 A1    8/2004

OTHER PUBLICATIONS

International Searching Authority, International Search Report for PCT/ES2012/070432 Mailed Sep. 10, 2012.
(Continued)

*Primary Examiner* — Daniel V Venne
(74) *Attorney, Agent, or Firm* — Ingrassia Fisher & Lorenz, P.C.

(57) ABSTRACT

A device for the remote tracking of water masses through a Global Positioning System (GPS) receiver equipped with a telecommunications modem and an electronic control board is provided. The device includes GPS locator enclosed within a floating watertight and sealed container or float. A method for the simultaneous management and operation of a set of one or more of such devices is also provided.

15 Claims, 5 Drawing Sheets

(51) Int. Cl.
*B63B 22/00* (2006.01)
*G01S 19/14* (2010.01)
*G01S 5/00* (2006.01)
*G08B 25/10* (2006.01)

(56) References Cited

U.S. PATENT DOCUMENTS

| | | | | |
|---|---|---|---|---|
| 5,108,326 | A | * | 4/1992 | Seiler ............................ 441/22 |
| 6,023,223 | A | | 2/2000 | Baxter |
| 7,528,711 | B2 | | 5/2009 | Kates |
| 8,312,768 | B2 | | 11/2012 | Duran Neira et al. |

OTHER PUBLICATIONS

International Searching Authority, Written Opinion for PCT/ES2012/070432 Mailed Sep. 10, 2012.
Austin et al, "The Design and Testing of Small, Low-cost GPS-tracked Surface Drifters." Estuaries, Dec. 2004, p. 1026-1029, vol. 27, No. 6.
Chereskin et al, "A Numerical Study of the Effect of Upper-Ocean Shear on Flexible Drogued Drifters." Journal of Atmospheric and Oceanic Technology, Apr. 1989, p. 243-253, vol. 6.
Gasser et al., "Field validation of a semi-spherical Lagrangian drifter." Scientia Marina, 2001, p. 139-143, 65.S1.
Geyer et al., "Field calibration of mixed-layer drifters." Journal of Atmospheric and Oceanic Technology, 1989, p. 333-342, 6.2.
Goodman et al., "Tracking buoys for oil spills." International Oil Spill Conference, 1995, vol. 1995. No. 1 American Petroleum Institute.
Gutierrez et al., "Real-Time Telemetry of Hydrodynamic and Hydrological Variables." Sea Technology Magazine, Aug. 2009, p. 47-51.
Kirwan et al., "The Effect of Wind and Surface Currents on Drifters." Journal of Physical Oceanography, 1975, p. 361-368, 5.2.
Kirwan et al., "The Near-Surface Circulation of the Eastern North Pacific." Journal of Physical Oceanography, 1978, p. 937-945, 8.6.
Niiler et al., "Measurements of the water-following capability of holey-sock and TRISTAR drifters." Deep Sea Research Part I: Oceanographic Research Papers, 1995, p. 1951-1964, 42.11-12.
Niiler et al., "Water-following characteristics of a mixed layer drifter." Deep Sea Research Part A. Oceanographic Research Papers, 1987, p. 1867-1881, 34.11.
Ohlmann et al., "GPS—Cellular Drifter Technology for Coastal Ocean Observing Systems." Journal of Atmospheric and Oceanic Technology, 2005, p. 1381-1388, 22.9.
Salman et al., "A Method for Assimilating Lagrangian Data into a Shallow-Water-Equation Ocean Model." Monthly Weather Review, 2006, p. 1081-1101, 134.4.
Ohlmann et al., "Interpretation of Coastal HF Radar—Derived Surface Currents with High-Resolution Drifter Data." Journal of Atmospheric & Oceanic Technology, 2007, p. 666-680, 24.4.
Sybrandy et al., "Global drifter programme barometer drifter design reference." DBCP Report 4, Aug. 2009, Revision 22, Published by the Data Buoy Cooperation Panel.
Albatros Marine Technologies, "MD02b User Manual." Version 0.4, believed to have been offered for sale or public use at least as early as Dec. 13, 2013.

* cited by examiner

DEVICE FOR REMOTELY TRACKING BODIES OF WATER AND METHOD FOR REMOTELY AND SIMULTANEOUSLY MANAGING AND OPERATING A SET OF SAID DEVICES

CROSS-REFERENCE TO RELATED APPLICATIONS

This application is a U.S. National-Stage entry under 35 U.S.C. §371 based on International Application No. PCT/ES2012/070432, filed Jun. 8, 2012, which was published under PCT Article 21(2) and which claims priority to Spanish Patent Application No. P201130980, filed Jun. 13, 2011, which are all incorporated herein in their entirety by reference.

TECHNICAL FIELD

The technical field relates to a device for the remote tracking of water masses through a Global Positioning System (GPS) receiver equipped with a telecommunications modem and an electronic control board, "GPS tracker" hereafter, enclosed within a floating and seal container, "float" hereafter, along with the method for the simultaneous management and operation of a set of one or more of such devices.

Thus, the technical field relates to the fields of monitoring of discharges, such as hydrocarbons or pollutants, fast tracking of water masses for the tracking of wrecks during the maritime rescue work, tracking of swarms of harmful marine organisms, Lagrangian characterization of oceanic currents and location of moorings.

BACKGROUND

Among the products currently available on the market for the tracking of surface water masses through GPS trackers, the following devices can be mentioned: buoy MD02 of the company Albatros Marine Technologies, buoy SVP and Microstar models of the company Pacific Gyre, buoys of the series SVP of the Metocean company, buoy TRBUOY of the Marexi company, buoy MLi of the Marine Instruments company, buoy ClearSat-1 of the Clearwater company and buoy ArgoDrifter of the Technocean company. In addition, non-commercial models are (or were) available (Austin et al., 2004, Gutiérrez et al. 2009), which were built for own use, with no commercial purposes.

These devices are mainly used to characterize the Langragian dynamics of a water mass. Among other applications, this is especially useful to generate databanks to feed and/or validate computational fluid dynamics models (Salman et al. 2006), to perform calibration/validation of radar HF stations for the surface currents measurements (Ohlmann et al. 2006) and to track discharges on the sea (Goodman et al. 1995).

There are also other floating devices used for different purposes, but whose geometry can be considered the closest state of the art to the present disclosure. This is the case of the floats of the rescue lights.

Regarding the design, the major requirements are the device to be able to track effectively the movement of the water parcel in which it is immersed and send regularly its position to a remote server. In this sense, there is a large number of references that allow to understand how the design and construction of these devices must be accomplished to guarantee the fulfillment of this requirements (Chereskin et al. 1989, Kirwan et al. 1975 and 1978, Niiler et al. 1987 and 1995, Ohlman et al. 2005, Sybrandy et al. 2009) and how the devices must be validated and/or calibrated in the field (Gasser et al. 2001, Geyer et al. 1989).

Regarding the remote management and operation of these devices, the only known document on the state of the art to manage and operate this kind of device is the English version of the MD02 buoy user manual, which contains much more information than its Spanish counterpart.

In addition, other objects, desirable features and characteristics will become apparent from the subsequent summary and detailed description, and the appended claims, taken in conjunction with the accompanying drawings and this background.

SUMMARY

According to various embodiments, the present disclosure provides a device for the remote tracking of water masses, whose float has a number of new features and technical advantages over the current state of the art, as well as a method of remote and simultaneous management and operation of a set of at least one of such devices.

With regard to the geometry for the float of the devices for tracking water masses, the following headspaces or cavities can be found therein, described from bottom to top: a lower cylinder aimed at accommodating at its lower end the heaviest elements, mainly energy accumulators, in order to allow the center of mass of the float to remain below and as far apart as possible from the waterline; optionally, it may include at its lower end a perforated appendix to attach accessories. The buoyancy excess induced by the headspace of this cylinder is compensated by the concavities described in the second headspace; a second cavity, substantially inverted truncated cone-shaped, aimed at providing a higher stability to the buoy against off the vertical displacements in relation to other geometries (spherical, cylindrical and ellipsoidal). The possible buoyancy excess caused by the existing headspace in the upper part of the first space and of this second one is compensated by concavities placed around the outer surface of this cavity, which reduce the volume of water displaced by the float when it is immersed into the fluid. Most of the electronic elements of the buoy can be stored in this headspace although the heaviest ones may also be located above the energy accumulators; the third space, located above the waterline, consists essentially of another truncated cone shaped platform whose larger diameter is greater than or equal to the larger diameter of the second space. Optionally, there may be a cylindrical space between the second and third spaces with a diameter equal to the larger diameter of the truncated cone of the second headspace. This part of the geometry hampers the buoy to sink in case of strong waves, acting also as a brake against oscillations and/or vertical forces. It can also serve as a support to accommodate elements for environmental energy collection, in case this type of autonomous power is preferred. For each one of the concavities sited in the second headspace, there is at least one watertight perforation on the float that crosses both the second and third headspaces to facilitate the attachment of accessories; the fourth headspace is mainly dedicate to house the receiving antennas of the GPS signal and of the communications signal. Its size should be as small as possible, compatible with the size of the antennas, to prevent that the friction with wind degrades the tracking of the water parcel by the tracking device. Finally, water-tightness inside the float is achieved by a plug and a gasket.

In relation to the device, the proposal of the present disclosure provides the following fundamental technical improvements with respect to these devices. First, the elements for energy storage and energy supply to the GPS tracker, generally the heaviest ones, are located far away from the waterline and from the cavities that give buoyancy to the set, elongating the room that encloses such elements. In this way, the centre of gravity of the entire device is kept the farthest away from the waterline than in any other existing model, thereby improving stability design against off the vertical deviations, which can be induced by wind and/or waves and; in compensation the headspace that is introduced provides additional buoyancy to the device, but it is compensated by the second technical improvement described in the next paragraph. Increasing the size of this cavity, also rises the number of energy accumulators that can be added to the device, hence enhancing its autonomy. Thus, by enlarging the headspace to house batteries, the buoy autonomy in the absence of another electric power generator is enhanced.

Second, the headspace that gives buoyancy to the device and that has an inverted substantially truncate-coned geometry, contains concavities aimed at reducing the volume of water displaced by this headspace and whose dimensions allow to compensate the buoyancy excess caused by the empty space mentioned in the previous paragraph; in this way, it is introduced the second technical improvement, which is a higher versatility to choose the dimensions of the truncate-cone (height, major and minor diameters ratio) to reach a compromise between the buoyancy of the device and its stability for off the vertical displacements. The concavities introduced in the lower truncate-coned headspace permit to compensate a possible buoyancy excess and extend the versatility to determine the geometry of said headspace Third: the upper cavity is conceived to store the communications antennas and GPS, thereby keeping them as far as possible from the waterline and introducing all the electronic elements within the float. This larger distance from the waterline and the fact that the antennas are contained into a watertight chamber minimizes their deterioration, increases the capturing capacity of both the GPS signal and communications signal, and lastly, as the rest of the float design maximizes the recovery capacity of the verticality, the synchronization losses between the GPS tracker and the network of global positioning satellites are reduced, as well as occasional shortcuts with the telecommunications channel. In conclusion, keeping the antennas as far as possible from the waterline than in other designs, leads to a reduction in the number of data of erroneous position that are due to the lack of synchronization with the network of GPS satellites; likewise, communications shortcuts caused by changes in the orientation of the antenna also diminish along with antenna damages, as they are not exposed to the weather.

Fourth, new mechanical elements are added to the design in order to facilitate attachment of accessories and allow the operator to adapt its use to the different applications with a higher versatility.

The description of the method for a remote management and operation that is performed in this specification includes: Providing the elements involved in the typical application for the tracking of a water mass using a set of at least one of the devices described above; a hierarchy of priorities for the exchange of information units between such elements is established; the basic information units that are exchanged by the different elements involved is established; assigning priority levels to said basic information units; and the flow of basic information units between the different elements in order to achieve a framework for an efficient management and operation of the applications that use the type of devices presented herein.

In relation to the method for the simultaneous and remote management and operation of the device for the tracking of water masses that was described in the preceding paragraphs, the elements involved in such method are: one or several of these devices, the hierarchy of priorities (P1 to P3) of the information units, units of basic information (U1 to U8) with the allocation of their priorities (P1 to P3). Likewise, the method indicates the flow of such information units between the different elements involved.

Among the elements involved in a generic application that uses the kind of device described herein, are: devices for the tracking of water masses that contain a GPS tracker as described herein; center for remote management and operation, formed by at least one general purpose computer equipment that is connected to such devices and implements a system for reallocation of priorities; local operator of the center for remote management and operation; —additional set of operators and/or remote supervisors that have an electronic device able to receive information from the center for remote management and operation.

The hierarchy of priorities of the information exchanged between such elements includes the three following levels of priority. P1: Information that has to be exchanged between two of the some elements previously described and whose reception must be guaranteed in real time. P2: Information transmitted between two of the some elements previously described, whose reception must be guaranteed although a lapse of time between the emission and reception of the information is allowed. P3: Information transmitted by one of the elements previously described in which the reception by another of these elements cannot be guaranteed, but the sender must be aware of its reception or not, in order to decide about its re-transmission.

The basic information units that are exchanged in this method are the following: U1.—If a device is accessible or not by the operation center; U2.—Request for the set of parameters recorded by any of the tracking devices; U3.—Response to a type U2 request, containing the set of parameters recorded by such device; U4.—Set of parameters recorded by the tracking devices that are periodically delivered to the center for remote management and operation, according to a cadence previously established by the local operator of the center; U5.—Requests for changes in the configuration of the tracking devices; and U6.—Confirmation or not of a change in the configuration by the devices.

The method identifies some special basic information units generated in the tracking devices, the so-called events, which respond to the detection of a change in the functioning status and that can affect their operation and/or represent a major shift in their operation and/or in the generated information. They are the only information units that may be optionally forwarded to the additional set of operators and/or supervisors. According to their priority, they can be divided into two groups: U7.—Critical events generated by the tracking devices that report of changes in both their status or functioning which are of great relevance for the management and operation of the devices in which they were generated; and U8.—Other events generated by the tracking devices that report changes in both their status or functioning which are important to be known by the local operator to perform an efficient operation and management method.

The allocation of priorities takes place according to the following Table:

| Basic information unit | Brief description | Priority level |
|---|---|---|
| U1 | Access to the device by the management center | P1 |

-continued

| Basic information unit | Brief description | Priority level |
|---|---|---|
| U2 | "Ad hoc" request of parameters to the device | P1 o P2 |
| U3 | Response to U2 | P2 |
| U4 | Regular delivery of parameters | P2 o P3 |
| U5 | Requests for changes in configuration | P2 o P3 |
| U6 | Confirmation of changes in configuration | same as U5 |
| U7 | Critical events | P1 o P2 |
| U8 | Other events | P2 o P3 |

As mentioned above, the description of the flow of the basic information units is also part of the description of the method that is presented according to various embodiments.

The U1-type information units are generated in the center for the remote management and operation by request (U1p) of the local operator and are directed to one of the tracking devices. The response (U1R) or lack of response by the device is interpreted by the center for the remote management and operation as an accessible or inaccessible device respectively, which is reflected in the user interface for local operator notification. These information units require a communications channel able to implement the conditions established by the P1-type priority.

The U2-type information units are generated in the center for the remote management and operation by request from the local operator and are directed towards some of the tracking devices. These information units require a communications channel able to implement the conditions established by the P1-type or P2-type priorities The U3-type information units are generated in the tracking devices and sent to the center for the remote management and operation for their storage and knowledge of the local operator. These information units require a communications channel able to implement the conditions established by the P2-type priority The U4-type information units are generated in the tracking devices at regular intervals and sent, also at regular intervals but not necessarily at the same cadence, to the center for the remote management and operation for their storage and knowledge of the local operator. These information units require a communications channel able to implement the conditions established by the P2-type or P3-type priorities.

The U5-type information units are generated in the center for the remote management and operation by request of the local user. These information units require a communications channel able to implement the conditions established by the P2-type or P3-type priorities.

The U6-type information units are generated in the tracking devices and sent to the center for the remote management and operation for their storage and knowledge of the local operator. These information units require a communications channel able to implement the same conditions as those established by the channel for the U5-type information units.

The U7-type information units, of critical event type, are generated in the tracking devices and sent to the center for the remote management and operation for their storage and knowledge of the local operator. These information units require a communications channel able to implement the conditions established by the P1-type or P2-type priorities. Optionally, the center for the remote management and operation may be set up to redistribute these information units to the additional set of to operators and/or supervisors. This redistribution may imply a change in the priority level of the information in the center for the remote management and operation (which has been described in the method as "System for priorities re-allocation"), converting such units to other units similar with respect to the carried information but with a lower priority to the original.

The U8-type information units, also of event type but not critical, are generated in the tracking devices and sent to the center for the remote management and operation for their storage and knowledge of the local user. These information units require a communications channel able to implement the conditions established by the P2-type or P3-type priorities. Optionally, the center for the remote management and operation may be set up to redistribute these information units to the additional set of operators and/or supervisors.

Hence, the device for the remote tracking of water masses comprises, at least one GPS modem, a GPS antenna, a telecommunications modem, a telecommunications antenna, modules for energy storage and a module for the buoy management, which are enclosed in a seal float. It also includes: a lower cylinder opened at its upper end to house the modules for energy storage. Its purpose is to contain at its lower end the heaviest elements, mainly energy accumulators, allowing the center of mass of the float to remain below the waterline and as far apart as possible from it; optionally, it incorporates at its lower end a perforated appendix for attachment of accessories. The buoyancy excess created by the headspace inside this cylinder is compensated by the concavities described in the first truncated cone body.

The device also includes a first truncated cone body with the smaller diameter end attached to the upper end of the lower cylinder, which comprises at least three concavities on its outer surface. This body is aimed at providing the buoy with a higher stability against off the vertical displacements as compared to that in other geometries (spherical, cylindrical and ellipsoidal). The possible buoyancy excess introduced by the headspace located on top of both the first and second cavities is compensated by incorporating concavities around the outer surface of this cavity that reduce the volume of water displaced by the float when immersed into the fluid. This headspace can house most of the electronic units of the buoy, although the heaviest ones may also be located right above the energy accumulators.

The device also includes a second truncated cone body with the larger diameter end attached to the larger diameter end of the first truncated cone body. This part of the geometry hampers the buoy to sink in case of strong waves, acting as a brake against oscillations and/or vertical forces. It can also serve as a support to accommodate elements for environmental energy collection, if this type of autonomous power is preferred. For each of the concavities sited in this second headspace, there is at least one water-tight perforation on the float that crosses both the first and second truncated cone bodies, to facilitate attachment of accessories.

The device includes a disk for attaching the larger diameter end of the first truncated conical shape to the free end of the cylindrical portion.

The device also includes a cylindrical element with an upper end domed and attached at its lower end to the smaller diameter end of the second truncated cone shape, where the GPS receiving antenna and the telecommunications antenna are housed. This element is mainly aimed at housing both the GPS receiving antenna and the telecommunications antenna. Its size should be as small as possible and compatible with the size of the antennas, in order to prevent the friction with wind to degrade the tracking of the water parcel by the tracking device. Finally, water-tightness inside the float is achieved by a plug and a gasket.

Moreover, the GPS modem, the telecommunications modem and the module for the management of the buoy are housed in a headspace located between the antennas and the module for energy storage.

In one exemplary embodiment, the larger diameter ends of the first and second truncated cone bodies are attached by the interposition of a cylindrical body.

In one embodiment, the larger diameter end of the second truncated cone body is larger than the larger diameter end of the first truncated cone body, with both ends being attached by an annular body.

In one embodiment, the cylindrical element comprises at least one plug and at least one rubber gasket to ensure tightness of the buoy float.

In one exemplary embodiment, the device has a hole on the upper surface of the second truncated cone body in correspondence with each one of the at least three concavities of the first truncated cone body, for the attachment of accessories.

In one embodiment, has a perforated appendix on the lower surface of the lower cylinder for the attachment of accessories.

In one embodiment, the walls of the cylindrical element are at least 50% longer than the larger diameter of the domed part in order to keep the antennas separate from the waterline of the buoy.

In one exemplary embodiment, the outer surface of the second truncated cone body comprises integrating solar cells connected to modules for energy storage.

On the other hand, the method for the remote and simultaneous management and operation of a set of devices for tracking water masses comprises, at least, making use of a tracking device, a remote center for operation and management, which in turn comprises at least one computer with internet access, wireless communication means, means for information storage, a user interface for at least one local operator and, at least, one electronic device to send and receive notifications from at least one remote operator, a hierarchy of priorities and a set of basic information units with a priority level given by the hierarchy of priorities.

In one exemplary embodiment, the hierarchy of priorities comprises a maximum of three levels, which are as follows:

Priority level P1 concerning information that must be exchanged in real time;

Priority level P2 concerning exchanged information whose reception must be guaranteed, a predefined time lapse between the emission and reception being permitted; and, Priority level P3 concerning exchanged information whose reception is selected among a reception known by the sender and an reception unknown by the sender.

In one embodiment, the method comprises the following phases:

sending from the center for the remote management and operation a request for access, with priority level P1, to at least one tracking device to determine if it is accessible; and, sending a response with a priority level P1 from the tracking device confirming its accessibility.

In one exemplary embodiment of the present disclosure, the method comprises the following phases:

sending from the center for the remote management and operation a request for parameters, with a priority level P1, to at least one tracking device; and, sending a response to the request for parameters, with a priority level P2, from the at least, one device that has received the previous request, to the center for the remote management and operation, containing the values of the parameters requested.

In one embodiment of the present disclosure, the method comprises the following phases:

sending from the center for the remote management and operation a request for parameters, with a priority level P2, to at least one tracking device; and, sending a response to said request, for parameters with a priority level P2, from the at least one device that has received the previous request, to the center for the remote management and operation, containing the values of the parameters requested.

In one exemplary embodiment, the parameters requested by the center for the remote management and operation being selected among variables generated by the GPS modem, an internal temperature of the tracking device, a power level of the device and a combination thereof.

In one embodiment, the method comprises sending periodically from at least one tracking device some parameters recorded by the device, with a priority level selected between priority levels P2 and P3, to the center for the remote management and operation.

In one exemplary embodiment of the present disclosure, the parameters periodically sent from the at least one tracking device are selected among variables generated by the GPS modem, an internal temperature of the tracking device, a power level of the device and a combination of thereof.

In one embodiment of the present disclosure, the method comprises the following phases:

sending from the center for the remote management and operation a request for a change in the configuration of the device, with a priority level P2, to at least one tracking device; and sending a confirmation of the change in the configuration of the device, with a priority level P2, from the at least one device that has received the previous request to the center for the remote management and operation.

In one embodiment of the present disclosure, the request for a change in the configuration of the device comprises being a request selected among: a request for a change in the configuration of a recording interval of variables generated by the GPS modem; a request for a change in the configuration of a recording interval of the internal temperature of the device; a request for a change in the configuration of a sending interval of the parameters that are sent periodically from the at least one device to the center for the remote management and operation; a request for a change in the configuration of a minimum threshold of the power level of the device; a request for a change in the configuration of a medium threshold of the power level of the device; a request for a change in the configuration of a maximum threshold of the internal temperature of the device; a request for a change in the configuration of a medium threshold of the internal temperature of the device; a request for a change in the configuration of a maximum threshold of the device speed; a request for a change in the configuration of a closed boundary to limit a geographical area of interest when the device leaves the geographical area; a request for a change of configuration in the a closed boundary to limit a geographical area of interest when the device enters into the geographical area; and, a combination of the former requests.

In one exemplary embodiment of the present disclosure, the method comprises the following phases:

sending from the center for the remote management and operation a request for a change in the device configuration, with a priority level P3, to at least one tracking device; and sending a confirmation of change in the device configuration, with a priority level P3, from at the least one device that has received the previous request to the center for the remote management and operation.

In one exemplary embodiment of the present disclosure, the request for a change in the configuration of the device comprises being a request selected among: a request for a change in the configuration of a recording interval of variables generated by the GPS modem; a request for a change in the configuration of a recording interval of the internal temperature of the float; a request for a change in the configuration of a sending interval of the parameters that are sent periodically from the at least one device to the center for the remote management and operation; a request for a change in the configuration of a minimum threshold of the power level of the device; a request for a change in the configuration of a medium threshold of the power level of the device; a request for a change in the configuration of a maximum threshold of the internal temperature of the device; a request for a change in the configuration of a medium threshold of the internal temperature of the device; a request for a change in the configuration of a maximum threshold of the device speed; a request for a change in the configuration of a closed boundary to limit a geographical area of interest when the device leaves the geographical area; a request for a change in the configuration of a closed boundary to limit a geographical area of interest when the device enters into the geographical area; and, a combination of the former requests.

In one embodiment, the method comprises generating critical events in the at least one tracking device and sending them, with a priority level P1, to the center for the remote management and operation.

In one exemplary embodiment of the present disclosure, the method comprises generating a critical event when one of the following circumstances occurs: the power level of the device is below a minimum power threshold; the internal temperature of the device is above a maximum temperature threshold; the device speed is above a maximum speed threshold; the device leaves a geographical region that has been previously defined by the local user; the device enters into a geographical region that has been previously defined by the local user; a combination of the former circumstances.

In one embodiment, the method comprises generating critical events in the at least one tracking device and sending them, with a priority level P2, to the center for the remote management and operation.

In one exemplary embodiment of the present disclosure, the method comprises generating a critical event when one of the following circumstances occurs: the power level of the device is below a minimum power threshold; the internal temperature of the device is above a maximum temperature threshold; the device speed is above a maximum speed threshold; the device leaves a geographical region that has been previously defined by the local user; the device enters into a geographical region that has been previously defined by the local user; and, a combination of the former circumstances.

In one embodiment, non-critical events are generated by the at least one tracking device and sending, with a priority level P2, to the center for the remote management and operation.

In one exemplary embodiment of the present disclosure, a non-critical event is generated when one of the following circumstances occurs: the internal temperature of the device is between the medium and maximum temperature thresholds; and, the voltage power of the device is between the medium and minimum voltage thresholds.

In one embodiment, non-critical events are generated by the at least one tracking device and sending them, with a priority level P3, to the center for the remote management and operation.

In one exemplary embodiment, a non-critical event is generated when one of the following circumstances occurs: the internal temperature of the float is between the medium and maximum temperature thresholds; and, the voltage power of the device is between the medium and minimum voltage thresholds.

In one embodiment of the present disclosure, the method comprises reassigning the priority level from P1 to P2 to the critical events and forwarding the critical events from the center for the remote management and operation to the electronic devices of the remote operators.

In one embodiment, the method comprises reassigning the priority level from P2 to P3 to the critical events and forwarding the critical events from the center for the remote management and operation to the electronic devices of the remote operators.

In one exemplary embodiment, the method comprises reassigning the priority level from P2 to P3 to the non critical events and forwarding the non-critical events from the center for the remote management and operation to the electronic devices of the remote operators.

In one embodiment of the present disclosure, the method comprises forwarding the critical events from the center for the remote management and operation to the electronic devices of the remote operators.

In one embodiment, the method comprises forwarding the non-critical events from the center for the remote management and operation to the electronic devices of the remote operators.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
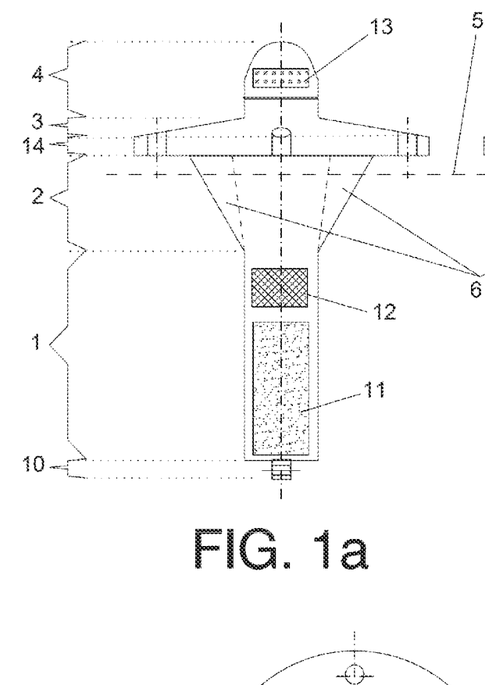
FIG. 1. is a float of a device for tracking water masses with four concavities: top (a), front (b) and lateral (c) view.
Figure 1B:
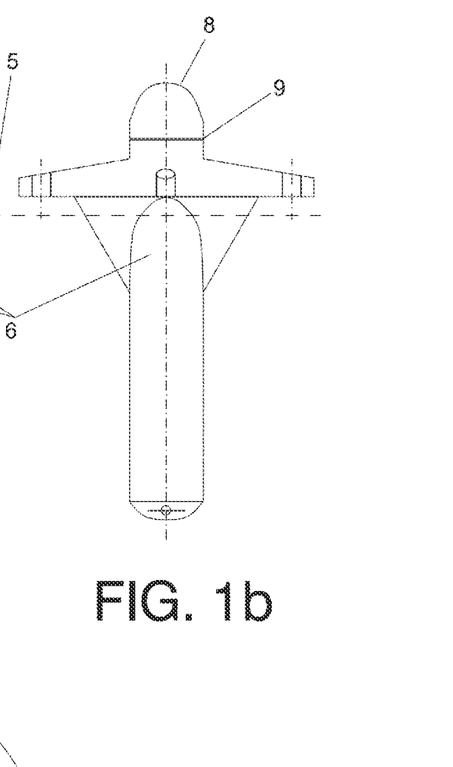
Figure 1C:
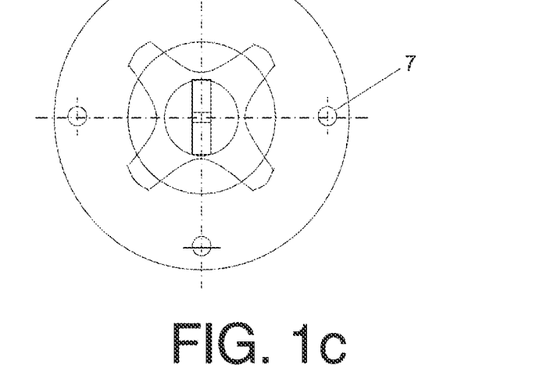

FIG. 1 shows a schematic plot of the geometry proposed for the float of a buoy with four concavities. The following spaces can be distinguished there:

A lower cylinder (1), empty, aimed at accommodating the heaviest elements, mainly power batteries (11), in order to keep the center of mass of the float far away from the waterline (5). This example includes at its lower end a perforated appendix for accessories (10) attachment.

A second space, essentially truncated cone-shaped (2) and empty, in this case with four cylindrical concavities (6), which are arranged equidistant from each other around the vertical axis of the float and aimed to compensate the buoyancy excess induced by the headspace of the lower cylinder and the rest of the truncated cone cavity; where part of the electronic elements of the GPS tracker (12) can be placed.

The third headspace (3), located above the waterline (5), is one truncated-cone shaped platform whose diameter is larger than or equal to the larger diameter of the second space (2). A small cylindrical headspace (14) can be distinguished between the second (2) and third (3) spaces. For each one of the concavities (6) there is one watertight perforation (7) that crosses the spaces 14 and 3 to facilitate accessories attachment (parachute, surface anchor, etc.).

The fourth headspace (4), that contains the GPS signal reception and the communications (13) antennas is open in order to allow the introduction of the elements (11), (12) and (13) inside the float. Watertightness inside the float is achieved by a plug (8) and a gasket (9).

Figures 2A, 2B:
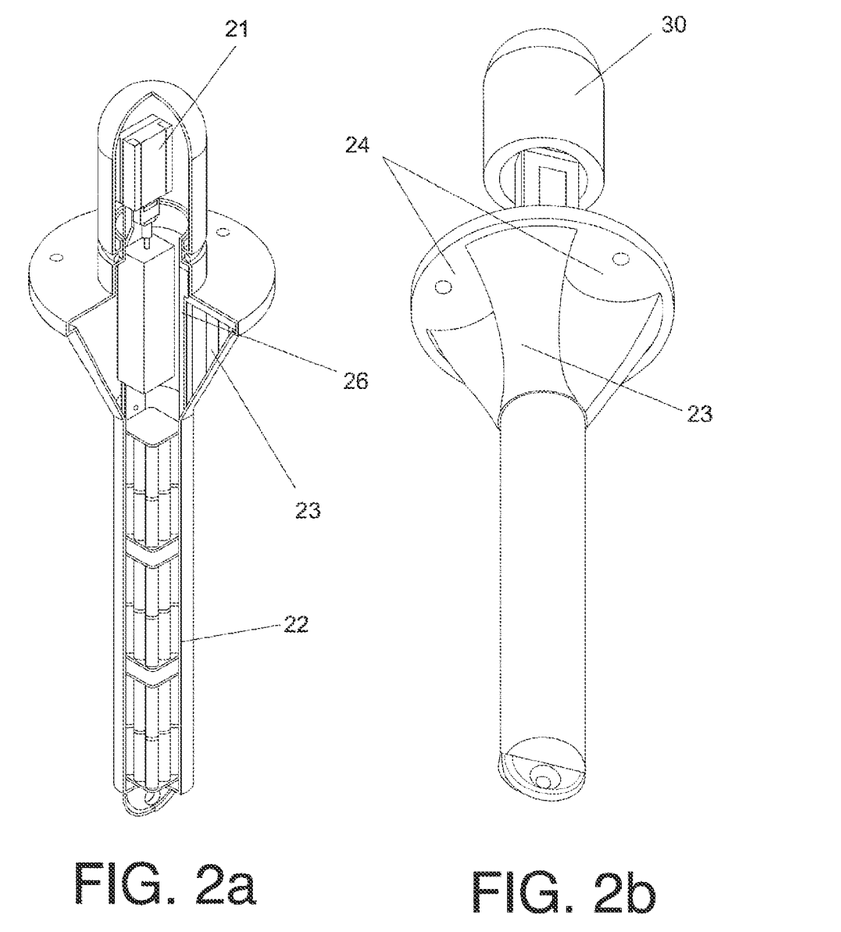
FIG. 2. is an exemplary embodiment of a device for the remote tracking of water masses, with a three concavities float and self powered by batteries.
Figure 2C:
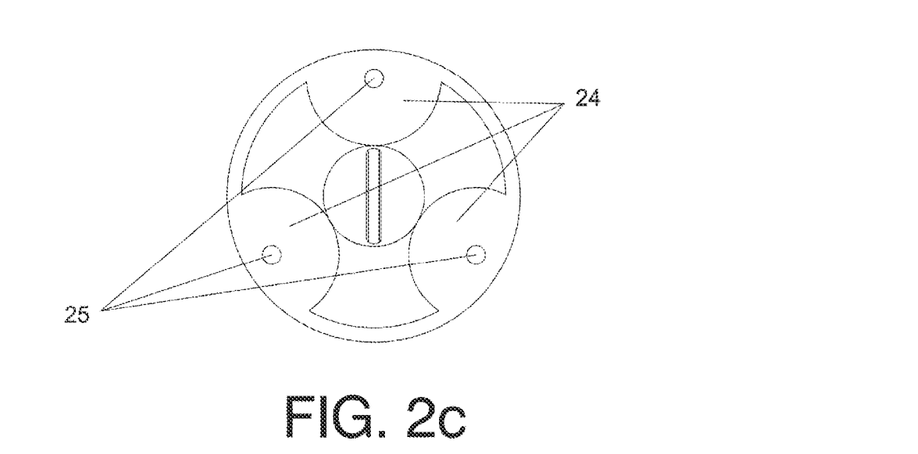

FIG. 2 presents a specific example of an embodiment of a device for the remote tracking of water masses, in this case with a three concavities float that is self powered by batteries. The arrangement of the elements that form the tracking device is shown in the left (a and b):

Lower cylindrical headspace of 380 mm in length, 66 mm of outer diameter and 4 mm in thickness, finished at its lower end by a disc of 66 m of diameter and 4 mm thickness with a perforated appendix to attach accessories. This headspace houses a battery bank (22), which in this particular example, consists of 6 elements connected in parallel, each of which is formed by 3×3 1.5 volt type AA alkaline batteries connected in series (13.5 volts total).

An intermediate empty and inverted truncated cone headspace (23) with a lower diameter of 66 mm, upper diameter of 200 mm, 120 mm height, 4 mm thickness, with three cylindrical concavities (24) equally spaced around the vertical axis of the float of 47 mm radius (c), with a watertight perforation (25) for each of them of 6 mm of diameter. These concavities allow for this embodiment of the present disclosure, the waterline to remain 10 mm below the intermediate cylindrical headspace if the material used has a specific weight of 0.9 g/cm3. This headspace accommodates a conversion stage (26) from the power voltage of 13.5 volts provided by the battery bank to the power level that the GPS tracker requires.

Intermediate empty and cylindrical truncated cone headspaces of 200 mm of larger diameter, 90 mm lower diameter, 12 mm height and 4 mm thickness.

Figure 2D:
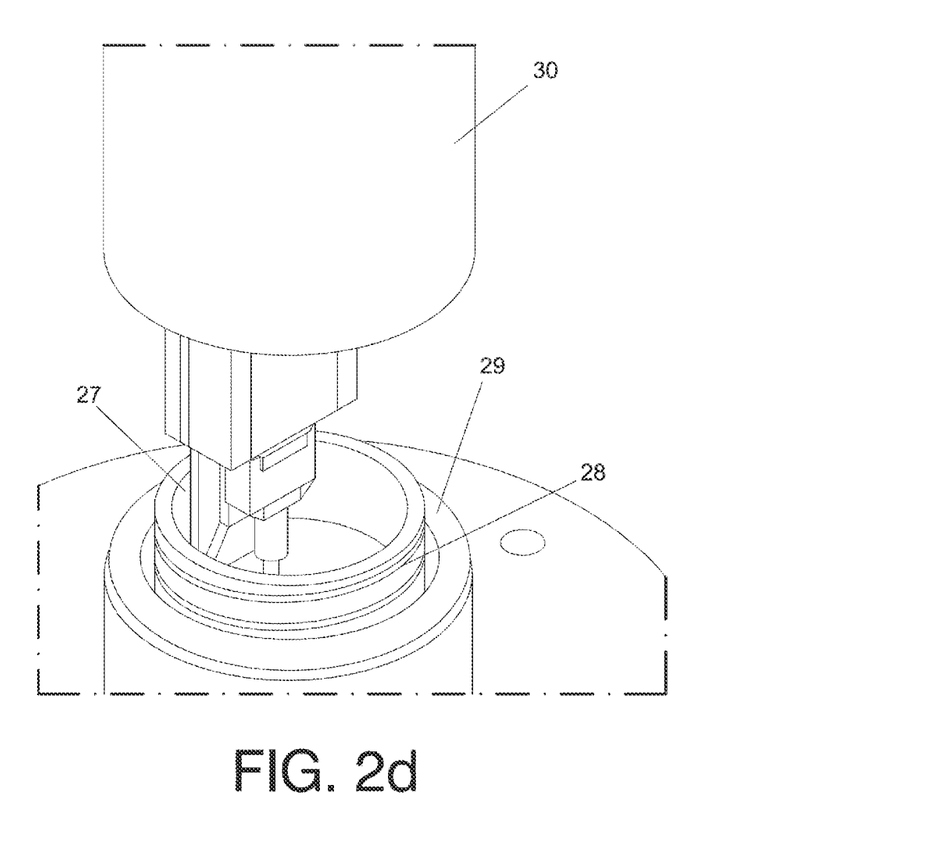

The detail of FIG. 2.d shows the upper cylindrical headspace (27) of 90 mm diameter, 30 mm height with an opening in its upper end of 75 mm equipped with a thread (28) and a site for a rubber gasket (29) or annular ring of 4 mm thickness and 4 mm width The float finishes at its upper end with an empty screw plug (30), with cylindrical geometry finished at its upper end by a spherical shell of 150 mm height and 90 mm of diameter. In this particular example, the cavity of the plug houses the commercial GPS tracker (21) with the antennas integrated.

Figure 3:
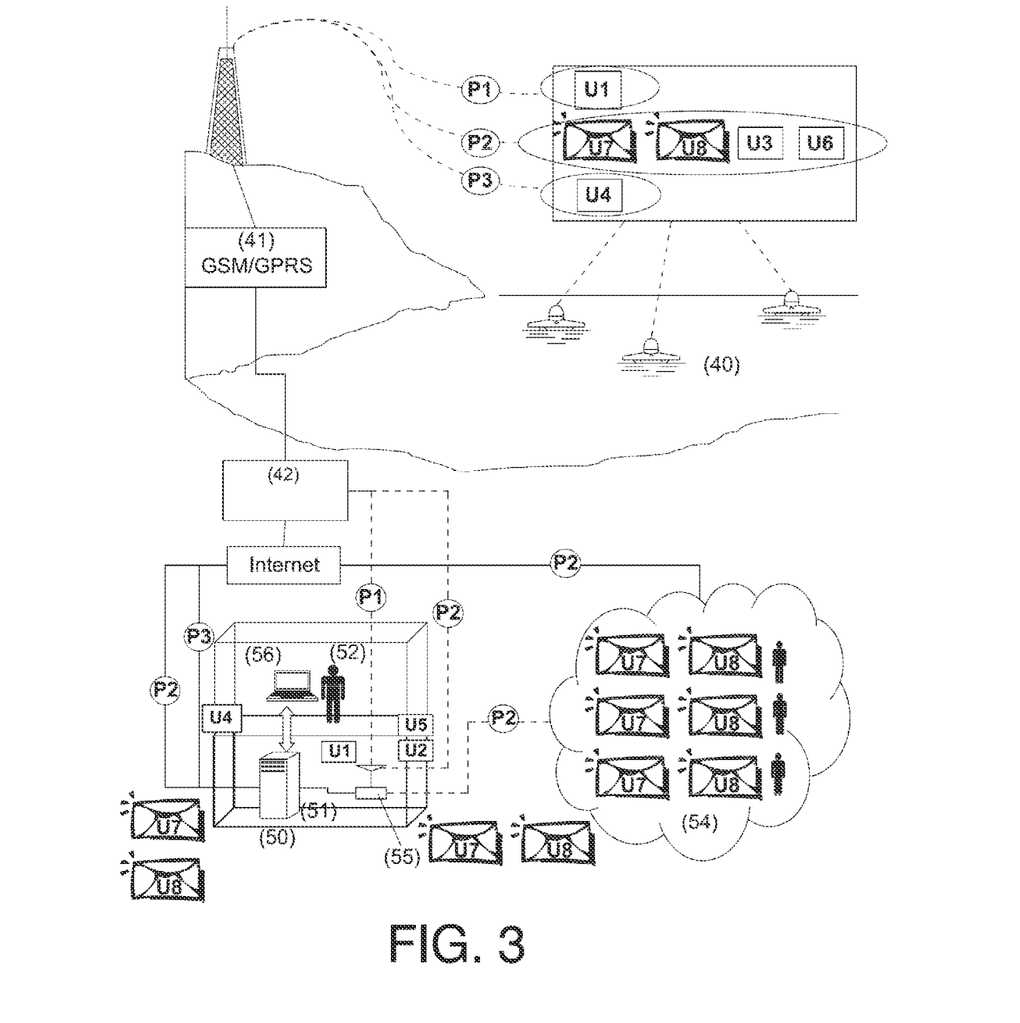
FIG. 3. is an exemplary embodiment of the method for the remote management and operation where the involved elements and the communications channels chosen to implement the priority levels of the present disclosure are shown.
Figure 4:
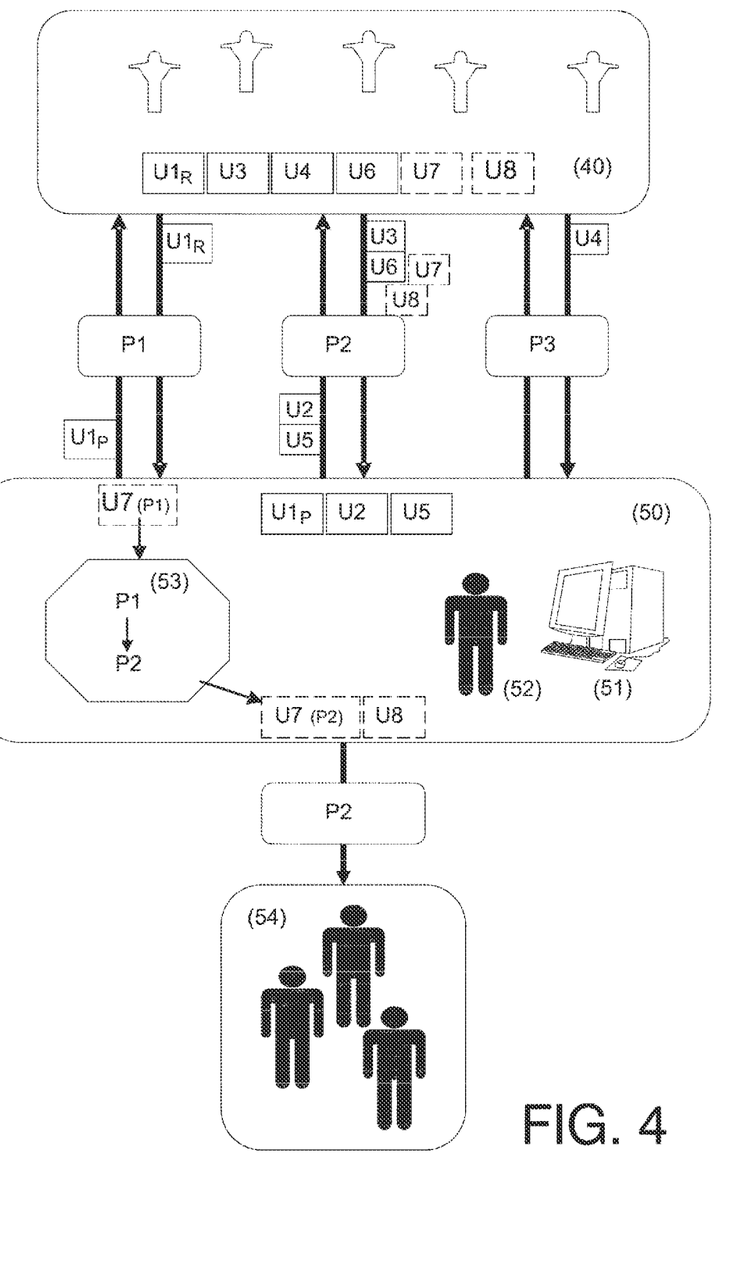
FIG. 4. is a flow of the basic information units of the method for the remote management and operation shown in FIG. 3.

FIGS. 3 and 4 show an exemplary embodiment of the method for the remote management and operation.

Regarding FIG. 3, firstly, devices for the tracking of water masses (40) as the one described above are found, with a GPS tracker containing a mobile GSM/GPRS communications modem; the center for remote management and operation (50), and the local user (52) with access through terminal (56) to the computer (51) of the operation center. This computer (51), has a telephone modem (55) (GSM) to implement information exchanges of priorities P1 and P2, and with internet access to implement information exchanges of priority levels P3 and P2 simultaneously to the P2 that was implemented with the phone modem. Through this modem, the computer is also responsible for resubmitting the notifications of events to the additional set of remote operators/supervisors via SMS (P2). Another way to resubmit the events to the additional set of remote users/supervisors is through e-mail (P2). GSM communications (priorities P1 and P2) between devices and the operation center are performed through the base station (41) and the telephone service provider (42).

The following Table completes the description of this example of embodiment, specifying the basic information units and the allocation of priority levels:

| Basic information unit | Description | Priority level |
|---|---|---|
| U1 | Access to the devices by the management center | P1 |
| U2 | "Ad hoc" request for a set of parameters to a device: battery level, internal temperature inside the case, position, speed, course, date, time. | P2 |
| U3 | Response from the device to U2 | P2 |
| U4 | Regular delivery of the parameters numbered in the request 2 | P3 |
| U5 | Requests for changes in configuration: sampling interval, interval of communications establishment, upper and lower thresholds for the event generation (U7 and U8) | P2 |
| U6 | Confirmation of configuration change U5 | P2 |
| U7 | Critical events: battery level below a minimum threshold, internal temperature inside the case above a maximum threshold, speed device higher than a maximum threshold, the device enters a predetermined geographical area, the device leaves a predetermined geographical area | P2 |
| U8 | Other events: battery level below a medium threshold and above the minimum threshold, internal temperature inside the case below the maximum threshold and above a medium threshold | P2 |

The way to implement the three priority levels is by selecting the following communication channels:

P1—By using GSM mobile phone network, through a voice call, wherein the real time in both communication directions is guaranteed.

P2—By using GSM mobile phone network, through the short message service (SMS) and also through the Internet e—mail service, containing the corresponding basic information unit P3—By using GSM mobile phone network, through GPRS data service and also using Internet establishing TCP/IP sockets between the operations center and the devices FIG. 4 shows a detail of the flow of the basic information units to perform the method for the remote management and operation described in FIG. 3.

Information units U3, U4, U6, U7 and U8 have their origin in the devices for tracking (40) the water masses. This is also the origin of the response to the request associated with the information unit U1 (U1R) or its absence to the request (U1P). All these information units are received in the center for the remote management and operation (50), which is managed by an operator (52).

Likewise, the operation center (50) is the origin of the information units U1, U2 and U5, among others, whose destination is any of the devices for tracking the water masses (40). Additionally, the operation center is also the origin of the information units (events) U7 and U8 that arrived from the tracking devices (40), which can be re-submitted to a new destination, in this case, the additional set of operators and supervisors (54). The information unit U7 submitted by center for the remote management and operation (50) contains the same information as the original unit U7 with priority P1, but the priority of such unit is reassigned to a lower priority level P2 by the operation center, which implements a system for re-allocation of priorities (53).

All information exchanged between (40), (50) and (54) is recorded by the computer (51) at the operation center (50).

Thus, through channel P1 the devices (40) and the operation center (50) can exchange information units types U1, U2 and U7, through channel P2 the units U2, U3, U4, U5, U6, U7 and U8 can be exchanged, and through channel P3 the units U4, U5, U5, U7 and U8 can be exchanged. Channel P2 can be also used to perform the re-submissions of events U7 (P2) and U8 from the operation center (50) to the set of additional operators (54).

FIG. 4 shows a physical embodiment of the method that has been schematically described in FIG. 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A device for the remote tracking of water masses comprising:
   at least one GPS modem,
   a GPS antenna,
   a telecommunications modem,
   a telecommunications antenna,
   one or more modules for energy storage,
   a management module for management of the device, and
   a seal float,
   the at least one GPS modem, the GPS antenna, the telecommunications modem, the telecommunications antenna, the one or more modules for energy storage and the management module being enclosed in the seal float, the seal float comprising:
   a first cylindrical element open at an upper end to house the one or more modules for energy storage;
   a first truncated cone body having a first end and a second end, the first end of the first truncated cone body having a diameter smaller than a diameter of the second end of the first truncated cone body, wherein the first end of the first truncated cone body is attached to the upper end of the first cylindrical element, and wherein the first truncated cone body comprises at least three concavities on an outer surface;
   a second truncated cone body having a first end and a second end, the first end of the second truncated cone body having a diameter smaller than a diameter of the second end of the second truncated cone body, wherein the second end of the second truncated cone body is attached to the second end of the first truncated cone body;
   a disk for attaching the second end of the first truncated cone body with a free end of a cylindrical portion; and,
   a second cylindrical element having a wall, a domed upper end and a lower end, the lower end being attached to the first end of the second truncated cone body, and the GPS antenna and the telecommunications antenna being housed in the second cylindrical element;
   the GPS modem, the telecommunications modem and the management module being housed in a headspace located between the telecommunications antenna, the GPS antenna and the one or more modules for energy storage.

2. The tracking device, according to claim 1, wherein the second end of the first truncated cone body and the second end of the second truncated cone body are attached by means of an interposed third cylindrical body.

3. The tracking device, according to claim 1, wherein the second end of the second truncated cone body is larger than the second end of the first truncated cone body, with the second end of the first truncated cone body and the second end of the second truncated cone body being attached by an annular body.

4. The tracking device, according to claim 1, wherein the second cylindrical element comprises at least one plug and at least one gasket to ensure tightness of the seal float.

5. The tracking device, according to claim 1, comprising at least one watertight perforation for each one of the at least three concavities of the first truncated cone body, the watertight perforations being located in an upper surface of the second truncated cone body, for the attachment of accessories.

6. The tracking device, according to claim 1, comprising a perforated appendix on a lower surface of the first cylindrical element, for attachment of accessories.

7. The tracking device, according to claim 1, wherein wall of the second cylindrical element is at least 50% longer than the largest diameter of the domed upper end to keep the telecommunications antenna and the GPS antenna separate from a waterline of the seal float.

8. The tracking device, according to claim 1, wherein an outer surface of the second truncated cone body comprises integrated elements for environmental energy collection connected to the one or more modules for energy storage.

9. A device for the remote tracking of water masses comprising:
   at least one GPS modem,
   a GPS antenna,
   a telecommunications modem,
   a telecommunications antenna,
   one or more modules for energy storage, and
   a management module for management of the device, and
   a seal float, the at least one GPS modem, the GPS antenna, the telecommunications modem, the telecommunications antenna, the one or more modules for energy storage and the management module being enclosed in the seal float, the seal float comprising:

a first cylindrical element open at an upper end to house the one or more modules for energy storage;

a first truncated cone body having a first end and a second end, the first end of the first truncated cone body having a diameter smaller than a diameter of the second end of the first truncated cone body, wherein the first end of the first truncated cone body is attached to the upper end of the first cylindrical element, and wherein the first truncated cone body comprises at least three concavities on an outer surface;

a second truncated cone body having a first end and a second end, the first end of the second truncated cone body having a diameter smaller than a diameter of the second end of the second truncated cone body, wherein the second end of the second truncated cone body is attached to the second end of the first truncated cone body;

a disk for attaching the second end of the first truncated cone body with a free end of a cylindrical portion;

a second cylindrical element having a wall, a domed upper end and a lower end, the lower end being attached to the first end of the second truncated cone body, and the GPS antenna and the telecommunications antenna being housed in the second cylindrical element; and the GPS modem, the telecommunications modem and the management module being housed in a headspace located between the telecommunications antenna, the GPS antenna and the one or more modules for energy storage, wherein the second cylindrical element comprises at least one plug and at least one gasket to ensure tightness of the float.

10. The tracking device, according to claim 9, wherein the second end of the first truncated cone body and the second end of the second truncated cone body are attached by means of an interposed third cylindrical body.

11. The tracking device, according to claim 9, wherein the second end of the second truncated cone body is larger than the second end of the first truncated cone body, with the second end of the first truncated cone body and the second end of the second truncated cone body being attached by an annular body.

12. The tracking device, according to claim 9, comprising at least one watertight perforation for each one of the at least three concavities of the first truncated cone body, the watertight perforations being located in an upper surface of the second truncated cone body, for attachment of accessories.

13. The tracking device, according to claim 9, comprising a perforated appendix on a lower surface of the first cylindrical element, for attachment of accessories.

14. The tracking device, according to claim 9, wherein walls of the second cylindrical element is at least 50% longer than the largest diameter of the domed upper end to keep the telecommunications antenna and the GPS antenna separate from the waterline of the seal float.

15. The tracking device, according to claim 9, wherein an outer surface of the second truncated cone body comprises integrated elements for environmental energy collection connected to the one or more modules for energy storage.

* * * * *